April 8, 1924.                                                          1,489,812
R. C. BENDER
ACCOUNT OR INDEX SYSTEM CABINET
Filed March 13, 1920          5 Sheets-Sheet 1
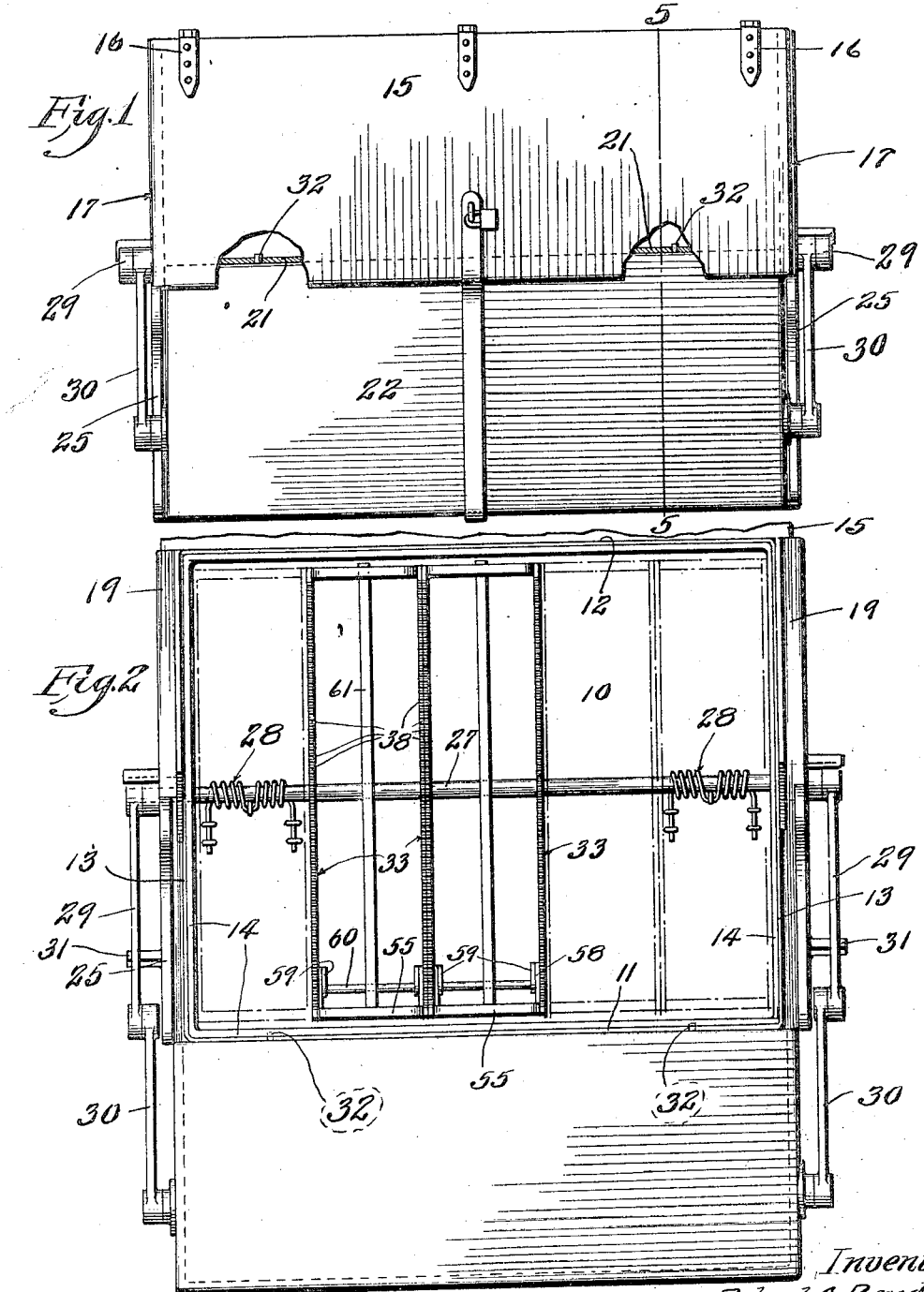

April 8, 1924.

R. C. BENDER 1,489,812

ACCOUNT OR INDEX SYSTEM CABINET

Filed March 13, 1920     5 Sheets-Sheet 2

Inventor
Robert C. Bender
By [signature] Atty.

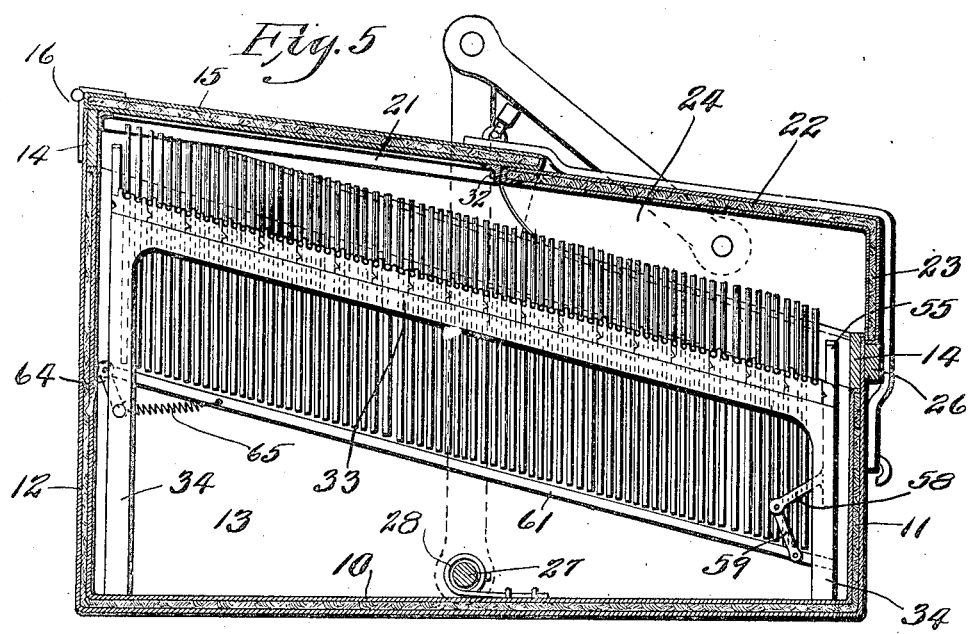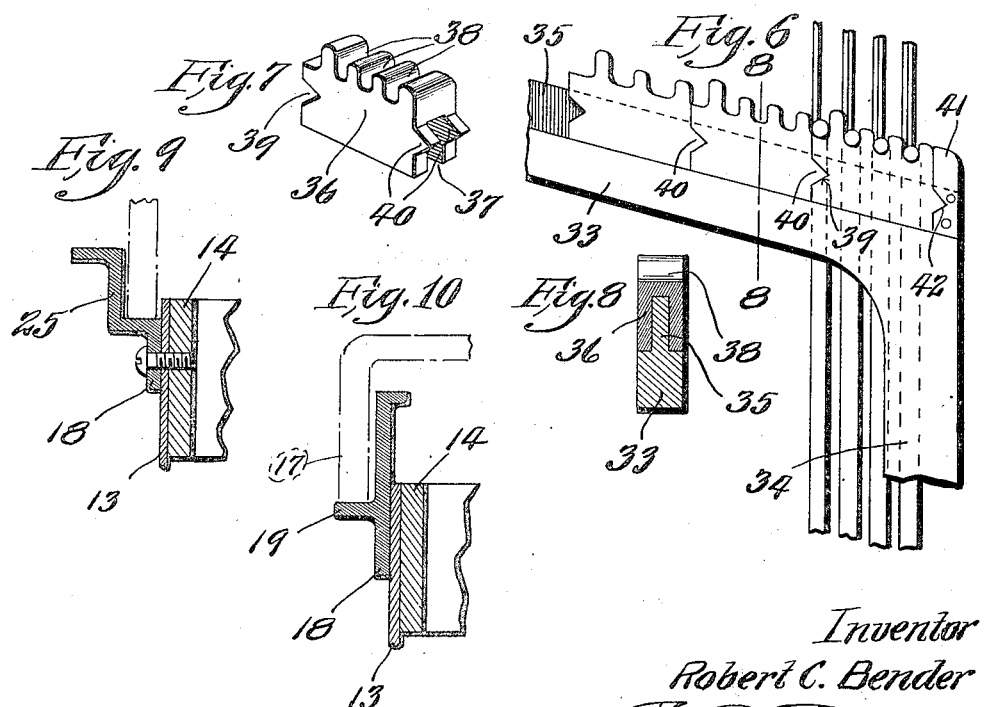

April 8, 1924.
R. C. BENDER
1,489,812
ACCOUNT OR INDEX SYSTEM CABINET
Filed March 13, 1920     5 Sheets-Sheet 4
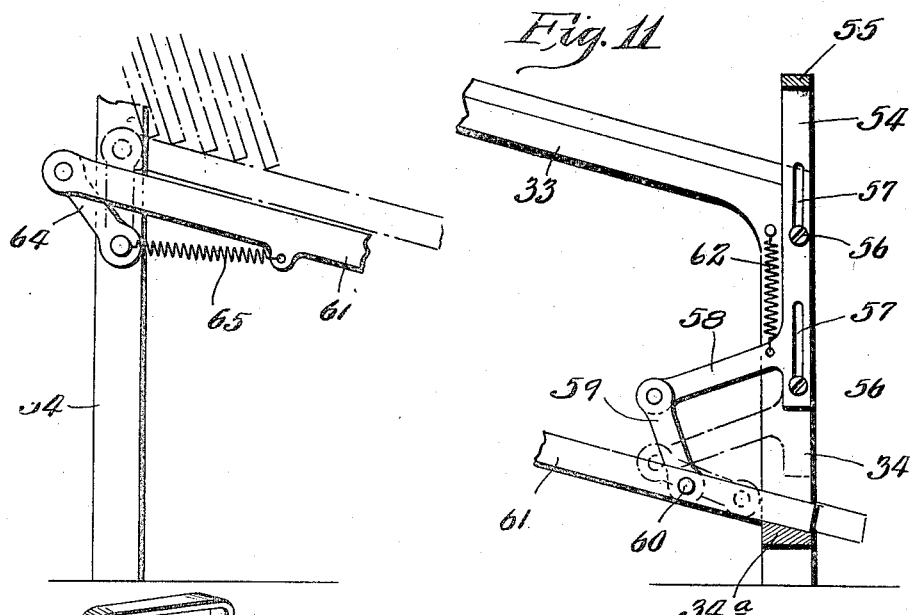
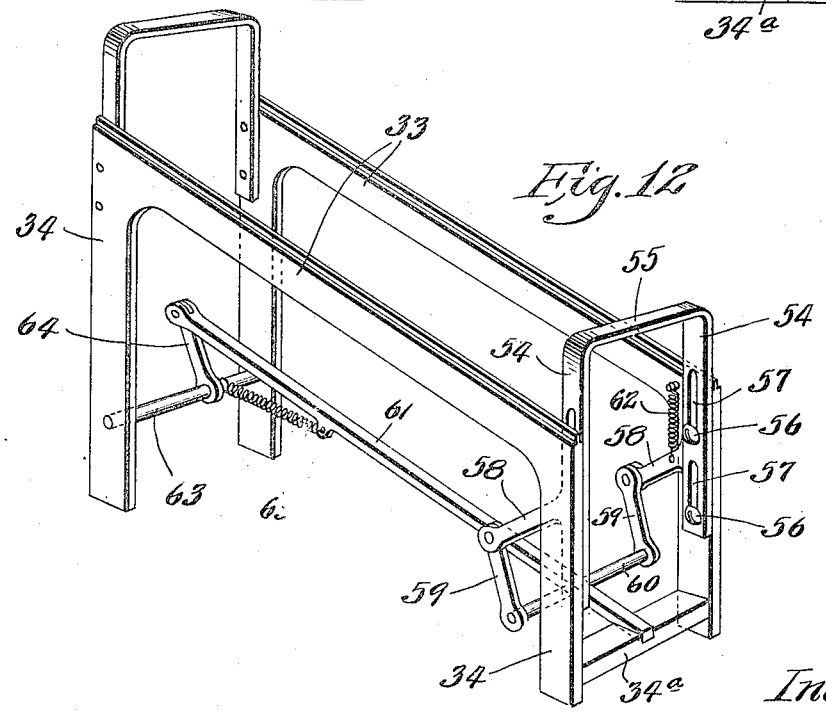
Inventor
Robert C. Bender
By *J. M. Arnwall* Atty.

April 8, 1924.
R. C. BENDER
1,489,812
ACCOUNT OR INDEX SYSTEM CABINET
Filed March 13, 1920     5 Sheets-Sheet 5
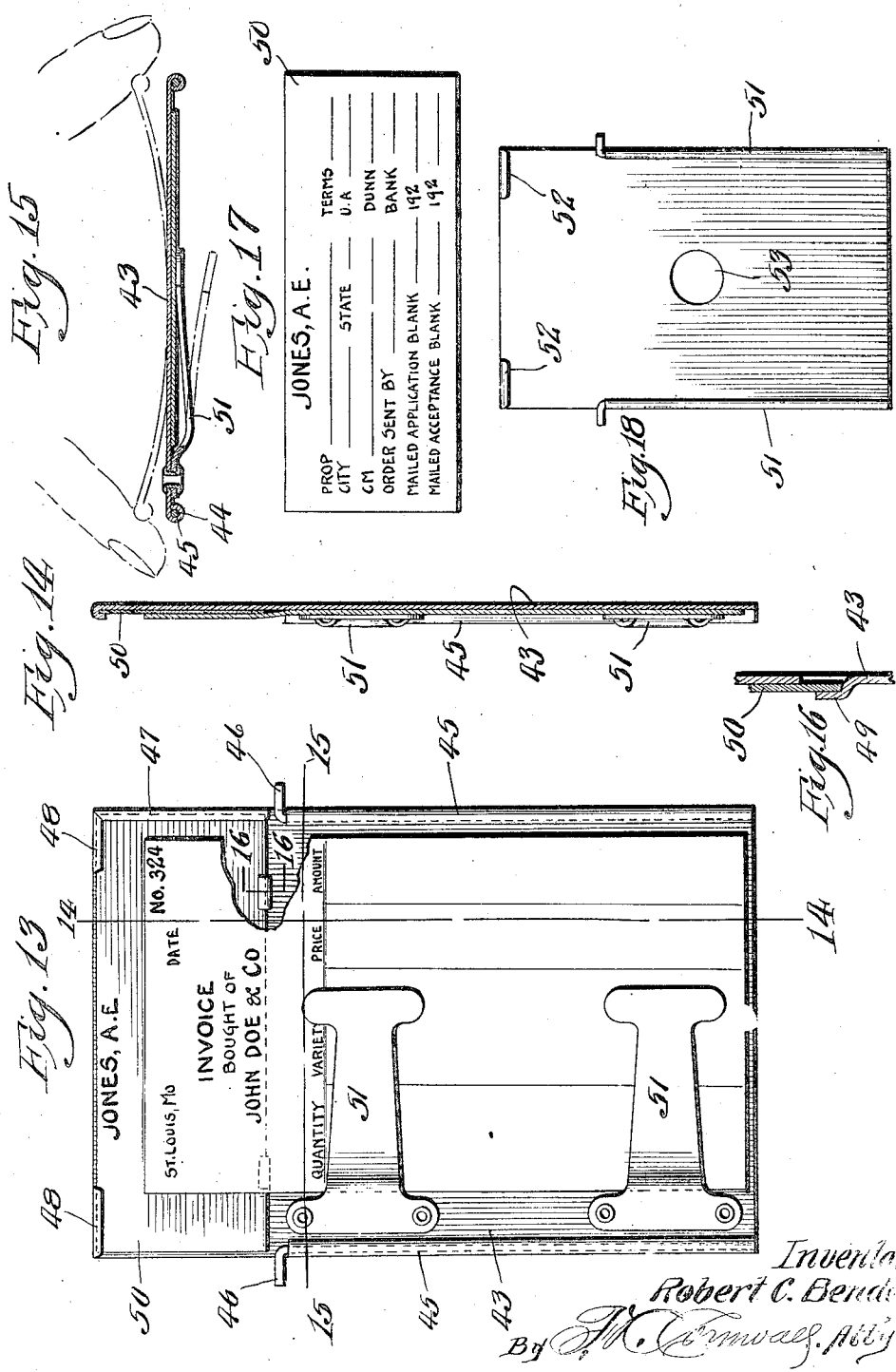

Patented Apr. 8, 1924.

1,489,812

UNITED STATES PATENT OFFICE.

ROBERT C. BENDER, OF ST. LOUIS, MISSOURI.

ACCOUNT OR INDEX SYSTEM CABINET.

Application filed March 13, 1920. Serial No. 365,401.

*To all whom it may concern:*

Be it known that I, ROBERT C. BENDER, a citizen of the United States, residing at St. Louis, Missouri, have invented a certain new and useful Improvement in Account or Index System Cabinets, of which the following is a full, clear, and exact description, such as will enable others skilled in the art to which it appertains to make and use the same, reference being had to the accompanying drawings, forming part of this specification.

My invention relates generally to a system of keeping accounts or records and to a cabinet which serves as a container for the individual account or record holders, and my present invention is an improvement on the account or index cabinet disclosed in Patent No. 1,279,969, issued to me September 14, 1918.

The principal object of my present invention is to generally improve upon and simplify the construction of the account or index cabinet disclosed in the patent aforesaid, and to provide a relatively simple, compact and efficient system for the keeping of ledger accounts, cost accounts, indexed records, or any records which require instant vision of a relatively large number of individual accounts, records, or data carrying elements which may be either alphabetically or numerically arranged.

Further objects of my invention are, to provide a simple and efficient container in the nature of a cabinet, the same serving as a holder or housing for the account or data bearing members of the system, said container being constructed so as to be practically fire-proof when closed; to construct the container with a plurality of movable members which combine to serve as a closure for the top of the cabinet, one of which members is connected to the container so as to be readily shifted into position where it will perform the functions of a desk; to provide within the container relatively simple supporting means that is inclined in order to hold, in spaced relation, the individual invoice record or data bearing members, so that portions thereof adjacent to their upper edges can be readily observed by a person standing in front of the cabinet; to provide simple and efficient means for tilting the entire series of data bearing members that are carried by one of the supporting frames so as to enable the upper portions of the data bearing members to be more readily observed when an operator desires to select and remove one or more of said data carrying members; to form the support for the data carrying members in sections so as to make it possible to easily and quickly remove or insert the data carrying members; and, further, to provide data carrying members constructed so that they will receive and retain in convenient manner, a number of invoices, cost sheets, record sheets, or the like.

With the foregoing and other objects in view, my invention consists in certain novel features of construction and arrangement of parts, hereinafter more fully described and claimed, and illustrated in the accompanying drawings, in which—

Figure 1 is a top plan view of the cabinet that constitutes the container of my improved account or record keeping system.

Figure 2 is a top plan view of the cabinet, the top thereof being open and with one of the parts of the cover shifted into position to serve as a desk.

Figure 5 is an enlarged cross section taken approximately on the line 5—5 of Figure 1.

Figure 6 is an enlarged elevational view of the forward portion of one of the inclined supporting rails that is positioned within the cabinet and utilized for holding or supporting the individual account carrying members.

Figure 7 is a perspective view of one of the notched sections utilized on the inclined supporting rails.

Figure 8 is a cross section taken approximately on the line 8—8 of Figure 6.

Figure 9 is an enlarged cross section taken approximately on the line 9—9 of Figure 4.

Figure 10 is an enlarged cross section taken approximately on the line 10—10 of Figure 4.

Figure 11 is a fragmentary elevational view of the means utilized for tilting or moving into angular position the individual account or data bearing members.

Figure 12 is a perspective view of one of the removable frames that is positioned within the container and which is provided with inclined supporting rails for the individual data bearing members.

Figure 13 is a front elevational view of one of the individual holders for invoices, cost sheets, or data bearing cards.

Figure 14 is a vertical section taken approximately on the line 14—14 of Figure 13.

Figure 15 is a horizontal section taken approximately on the line 15—15 of Figure 13.

Figure 16 is an enlarged detail section taken approximately on the line 16—16 of Figure 13.

Figure 17 is an elevational view of a data bearing card that is adapted to be used on the form of holder illustrated in Figure 13.

Figure 18 is a front elevational view of a modified form of the data carrying member.

Figure 3:
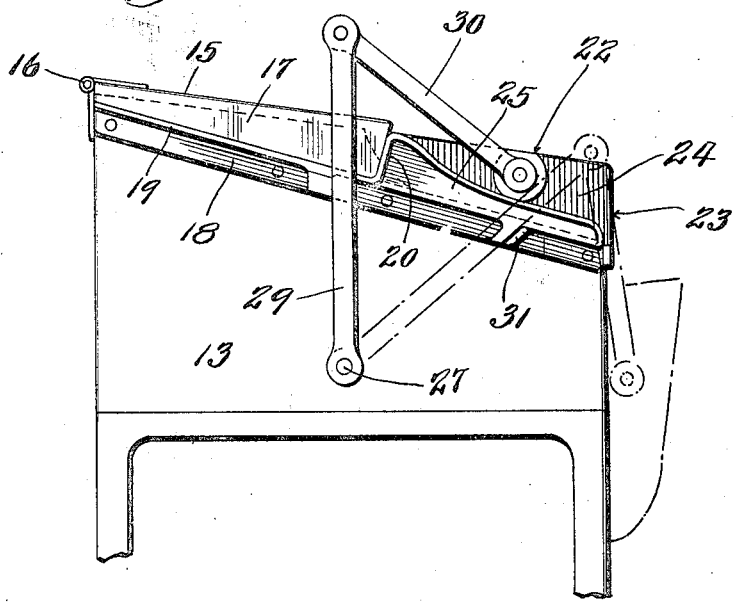
Figure 3 is an end elevational view of the cabinet.

Referring in detail to the drawings, and particularly to Figures 1 to 5 inclusive, it will be noted that the cabinet or container forming a part of my invention is in the form of an elongated box-like structure which includes a bottom 10, front wall 11, rear wall 12, and end walls 13. These walls and bottom are preferably constructed of sheets of metal spaced apart and arranged substantially parallel with each other and the spaces between said sheets being packed with asbestos or the like, thereby forming a substantially fire-proof structure.

The front wall 11 is not as high as the rear wall 12 and the side walls 13 are formed so that their upper edges are inclined upwardly toward the rear wall. Secured in position on top of the front, rear, and end walls of the cabinet is a rectangular frame 14 of metal, the same serving to stiffen and reinforce the upper portion of the body of the cabinet and to form a support for the top closing members. The rear one of these top closing members comprises a substantially flat plate 15 formed of a pair of sections of sheet metal spaced apart and with a filler of asbestos or the like, the rear edge of this flat member being connected by suitable hinges 16 to the rear rail of frame 14. This cover plate 15 is provided at its ends with depending portions 17 which overlie the rear portions of metal rails 18, the latter being secured in any suitable manner to the upper portions of the end walls 13 of the cabinet.

When closed, as illustrated in Figures 3 and 5, the lower edges of the depending end members 17 of the rear cover plate rest directly upon a flange 19 that is formed integral with and projects outwardly from the rear portion of rail 18. (See Figs. 3 and 10.)

At a point near the center of rail 18, the flange 19 is bent upwardly to form a shoulder 20 and when the rear cover member 15 is closed, the front edges of the depending portions 17 bear directly against these shoulders 20. Secured to the underside of the rear cover member 15 is a rectangular frame 21 formed of angle bars, and the rear rail of this frame is positioned so that when the rear cover member is closed it will bear directly against the inner face of the rear rail of frame 14, thereby forming an air and dust-tight joint. The front rail of this frame 21 is positioned a short distance rearwardly of the front edge of the cover plate 15. The front cover member includes a substantially flat plate 22 formed of sections of sheet metal spaced apart and a filling of asbestos or the like, and depending from the front edge of this plate is a short vertically disposed wall 23. Depending from the ends of the plate 22 are end members 24 which, when the front cover member is closed, rest directly upon the front portions of the rails 18, the latter being provided in front of the shoulders 20 with upwardly projecting flanges 25 that are positioned immediately against the outer faces of the lower portions of said end members 24.

Secured in any suitable manner to the upper portion of front wall 11 and preferably to the front rail of the frame 14 is a horizontally disposed rail 26, the upper edge of which occupies a plane slightly below that occupied by the upper edge of said front rail. When the front closure is in closed position, the lower edge of the depending front member 23 rests directly on top of rail 26, and the rear portion of plate 22 is positioned directly beneath the front portion of plate 15 and with the rear edge of said plate 22 bearing against the front rail of angle bar frame 21. (See Fig. 5.)

By virtue of the constructions just described, joints that are practically air, dust, and moisture proof are formed between the top closure member and between said members and the upper portions of the walls of the cabinet.

The hinged or pivotal connections between the front closure member and the body of the container include a rock shaft 27 that is journaled in suitable bearings formed in the lower portions of the end walls 13 of the cabinet, and positioned upon said shaft near its ends are torsional springs 28 which normally tend to rotate said shaft anti-clockwise. The ends of this shaft project through the end walls 13 and secured to said projecting ends are the lower ends of links 29, the upper ends of the latter being pivotally connected to the upper ends of shorter links 30, the lower ends of the latter being pivotally connected to the depending end walls 24 of the front closure member.

Figure 4:
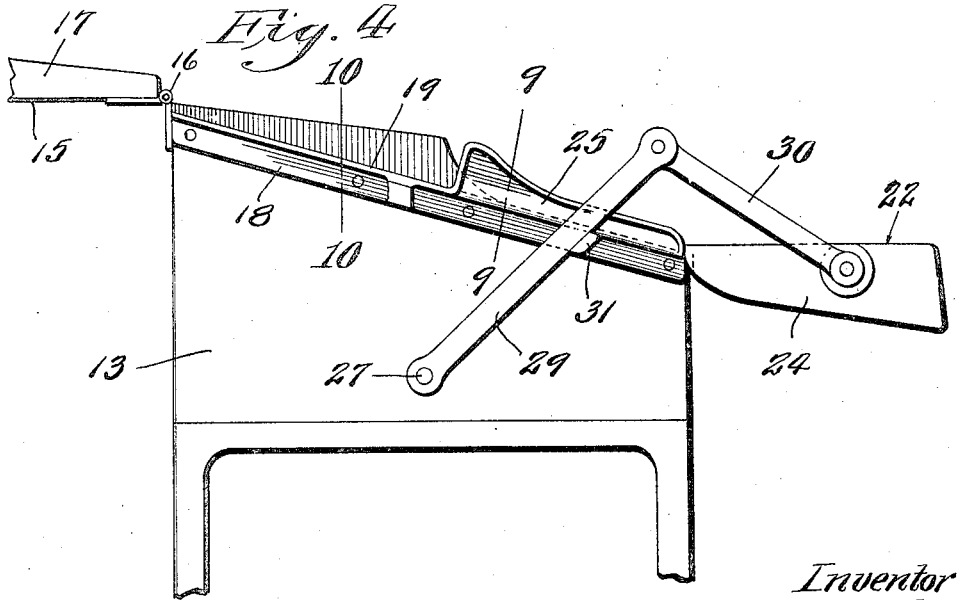
Figure 4 is an end elevational view of the cabinet with a part of the cover thereof shifted into position for use as a desk.

When member 22 is in closed position, the links 29 occupy substantially vertical positions, as illustrated in Figure 3, and when said member 22 is shifted into an out-of-the-way position, as illustrated by dotted lines in Figure 3, or into a substantially horizontal position in front of the cabinet to serve as a desk, as illustrated in Figure 4, the links 29 are swung forwardly into angular positions and when so disposed they bear on stop brackets or flanges 31 that are formed integral with and project outwardly from the front portions of rails 18.

Projecting from the rear edge of top plate 22 of the front closure are short pins 32 which, when the member 22 is closed, occupy suitably formed apertures in the front rail of frame 21, and when said member 22 is shifted into position to be used as a desk, as illustrated in Figure 4, these pins project into suitably formed apertures formed in the front rail of frame 14 immediately above rail 26. (See Fig. 2.)

Removably positioned within the cabinet and arranged side by side is a series of skeleton frames constructed substantially as illustrated in Figure 12, each frame comprising a pair of substantially parallel rails 33 that are inclined gradually toward their rear ends and said rails being supported by front and rear legs 34. The tops of the inclined rails 33 are provided with centrally arranged upwardly projecting ribs 35, the same serving as bearings for the notched members that serve as supports for the trunnion or ears on the removable invoice or account carrying plates. These notched supporting members may be formed of hard rubber, porcelain, or like material, and they are constructed in relatively short sections in order to enable one or more sections to be readily removed from a supporting rail. Each of these notched members is constructed substantially as illustrated in Figure 7, and comprises a substantially rectangular body 36, the lower portion of which is bifurcated or slotted lengthwise as designated by 37 in order to accommodate the upwardly projecting rib 35 of the supporting rail 33.

The upper portion of the body 36 is provided with a plurality of transversely disposed notches 38 which are adapted to receive the trunnions or pins projecting outwardly from the sides of the invoice or data bearing holders, thereinafter more fully described, and the rib between the rear pair of notches in each block is higher than the other ribs in order to form a guide to enable an operator to readily replace one of the invoice or data bearing plates.

Formed in the rear end of each notched block are recesses such as 39, and projecting forwardly from the front end of the block are lugs such as 40, and by virtue of this construction, the notched members will, when properly assembled, be interlocked with each other, thereby enabling the entire series of blocks on one of the rails 33 to be moved lengthwise upon the rail when one or more additional blocks are being positioned on the front end of the supporting rail. Formed on or fixed to the forward ends of the ribs 35 are blocks 41 which serve as bearings for the front notched members of each series, and these blocks 41 are notched or recessed as designated by 42 in order to accommodate the lugs 40 on the forward ends of said front notched members.

The invoice or record bearing members forming a part of my improved system may vary in construction to suit different requirements, but in Figures 13 to 18 inclusive, I have illustrated two relatively simple and practical forms of holders.

The preferred form of holder, as illustrated in Figures 13 to 16 inclusive, comprises a substantially rectangular plate 43 of relatively thin flexible material, such as sheet metal, the greater portions of the side edges of which are rolled over wire rods 44 to form marginal beads 45, the same terminating at short distances below the top or upper edge of the plate. The upper ends of the wire rods 44 project beyond the upper ends of the beads 45, and said projecting ends are bent outwardly into horizontal planes to form short ears or fingers 46 that are adapted to rest in the notches 38 in the sectional supporting members 36.

In order to retain the data bearing card of the type illustrated in Figure 17 on the upper front portion of the plate 43, one of its side edges above the corresponding bead 45 is bent forwardly and thence inwardly to form a retaining lip 47 and portions of the upper edge of the plate adjacent to its sides are bent downwardly to form retaining lips 48. Two or more retaining lips such as 49 are stamped or pressed forwardly from the body of plate 43, preferably in a horizontal line just above the plane occupied by the fingers 46. These retaining lips 47, 48, and 49 overlie portions of the edges of a card such as 50, on which may be written or printed suitable data or headings adjacent to which may be written data relating to the invoices or record sheets which are to be placed on the holder to which said card is applied.

Secured in any suitable manner to the plate 43 adjacent to one edge thereof and preferably the lefthand edge are the outer ends of resilient retaining fingers 51, the free ends of which are adapted to yieldingly bear against the front face of the plate 43 at points near its transverse center.

By engaging the beaded side edges of the plate with the thumb and fingers and exerting pressure so as to force a central portion of the plate forwardly, the free ends of the retaining fingers 51 will be moved away from the front face of the plate a sufficient distance to permit the ready insertion or removal of invoice or record bearing sheets. (See dotted lines, Fig. 15.)

The form of holder illustrated in Figure 18 is adapted to receive a single large ledger card or cost accounting card, the same being retained in position on the holder by having its side edges engaged beneath the inner edges of the beads 51 that are formed on the sides of said holder and by having portions of their upper edges positioned beneath retaining lips 52 that are formed on the upper edge of said holder. Formed in the center of this holder is an aperture 53 which enables the central portion of the card to be pushed forwardly when it is to be removed from the holder.

The means utilized for tilting an entire series of the invoice or data bearing holders for the purpose of increasing the visibility of the data appearing on the upper portions of the sheets or cards carried by said holders, is illustrated in Figures 11 and 12, the construction of said means being substantially as follows:

Arranged for vertical sliding movement upon the inner faces of the front legs of each supporting frame are the vertically disposed legs 54 of an inverted U-shaped frame 55, said legs 54 being retained in sliding engagement with the legs 34 by pins such as 56 that pass through slots 57, the latter being formed in the legs of the inverted U-shaped frame. Extending downwardly and rearwardly from the legs 54 are arms 58 and pivotally connected to the lower rear ends thereof are links 59. Carried by the lower ends of the links 59 is a transversely disposed rod 60, the central portion of which is journaled in a longitudinally disposed bar 61, the same occupying an inclined plane that is normally parallel with the plane occupied by the rails 33. The forward end of this bar 61 is arranged for sliding movement in a cross piece 34ª that connects the lower portions of the front legs or standards 34.

Secured to one or both of the arms 58 are the lower ends of retractile springs such as 62, the upper ends of the latter being secured to the forward portions of rails 33. These retractile springs normally maintain inverted U-shaped frame 55 at its upper limit of movement. Journaled in the lower portions of the rear pair of legs 34 is a transversely disposed rock shaft 63 and carried thereby is an upwardly and rearwardly projecting crank arm 64 to the upper end of which is pivotally connected the rear end or bar 61. Connected to shaft 63 is the rear end of a retractile spring 65, the forward end of which is connected to bar 61.

Under normal conditions or with the invoice or data bearing holders occupying vertical positions as illustrated in Figure 5, the bar 61 is positioned immediately below the lower edges of the entire series of data bearing holders. When frame 55 is moved downward, the upper ends of links 59 will necessarily be moved downward, thereby causing the forward ends of said links carrying the rod 60 to move forwardly, and as a result, bar 61 will be moved forward, during which movement its forward end will slide over rail 34ª. As bar 61 is thus moved forward, the upper end of crank arm 64 will be swung forwardly and upwardly, thereby materially increasing the inclination of the bar 61 and as the latter bears against the lower edges of the invoice or data bearing holders 43, the latter will be inclined or swung upon their points of pivotal support so that their lower ends will move forwardly and their upper ends will move rearwardly. (See dotted lines, Figure 11.)

By thus shifting the invoice or data bearing holders into angular positions, the upper portions of the data bearing cards 50 will be exposed to a greater degree than when said holders occupy their normal or vertical positions, and this is particularly true of those holders toward the rear of each series, for it will be understood that those holders near the forward end of each series will not be inclined to any great extent due to the forward sliding movement of the bar 61 over the rail 34, but this relatively small change of position of the forward holders is not so essential by reason of the fact that the upper portions of said forward holders are directly beneath the eye of the operator or person positioned directly in front of the cabinet.

When the cabinet is closed, the members 15 and 22 occupy the positions as illustrated in Figures 3 and 5, and with the parts so positioned, the records carried by the holders 43 are effectually protected against dust, moisture and fire.

To open the cabinet, closure member 15 is swung upwardly, rearwardly, and downwardly into the position illustrated in Figure 4, and front closure member 22 may be swung into an out-of-the-way position as illustrated by dotted lines in Figure 3, or it may be shifted into a substantially horizontal position as illustrated in Figure 4 to serve as a desk which will greatly assist the bill clerk or bookkeeper in his work. When closure member 22 is swung into open position and the arms 29 are brought forwardly, the springs associated with rock shaft 27 are put under tension and the power thus stored in said springs is utilized in returning the closure member 22 to its normal or closed position.

The invoice or record bearing holders 43 are capable of being readily positioned upon or removed from the sectional supporting members 36 and the latter can be readily moved lengthwise upon the supporting rails 33 when it becomes necessary to place additional holders in a series, as, for instance, when new accounts or records are being placed in the system.

A system of my improved construction is relatively simple, is very compact, and can be advantageously and economically employed for the keeping of all accounts and records, such as ledger accounts in bookkeeping systems, cost accounts, production data, index records, or any data or record keeping system that involves a relatively large number of separate or individual data bearing elements that may be either alphabetically or numerically arranged.

It will be readily understood that minor changes in the size, form and construction of the various parts of my improved account or index system cabinet can be made and substituted for those herein shown and described, without departing from the spirit of my invention, the scope of which is set forth in the appended claims.

I claim:

1. In a record keeping system, a cabinet comprising a box-shaped member, a pair of members adapted to cooperate and form a closure for the top of said cabinet, said closure member being provided with end walls, and rails applied to the ends of the cabinet, portions of which rails are provided inside the end walls of one of the closure members and outside of the end walls of the other member.

2. In a record keeping system, a cabinet, means arranged therein for holding record bearing members in spaced arrangement, record bearing members removably positioned on said supporting means, and means for simultaneously tilting the entire series of record bearing members so as to increase the visibility of the data appearing thereupon.

3. In a record keeping system, a cabinet, a skeleton frame removably positioned in said cabinet, said frame being provided with notched inclined supporting rails, and record holders removably positioned between said supporting rails and having portions loosely arranged in the notches thereof.

4. In a record keeping system, a cabinet, a skeleton frame removably positioned in said cabinet, said frame being provided with notched inclined supporting rails, record holders removably positioned between said supporting rails and having portions loosely arranged in the notches thereof, and means associated with the frame for tilting said holders.

5. In a record keeping system, a cabinet, a skeleton frame removably positioned in said cabinet, said frame being provided with inclined rails, notched members removably positioned on said rails, and record holders adapted to be positioned between said rails and having laterally projecting portions which are adapted to occupy the notches in said members.

6. In a record keeping system, a cabinet, a skeleton frame removably positioned in said cabinet, said frame being provided with inclined rails, notched members removably positioned on said rails, record holders adapted to be positioned between said rails and having laterally projecting portions which are adapted to occupy the notches in said members, and means for tilting said record holders in order to increase the visibility of the record data carried by said holders.

7. In a record keeping system, a cabinet, a skeleton frame removably positioned in said cabinet, said frame being provided with inclined rails, notched members removably positioned on said rails, and said notched members being interchangeable and having interengaging portions which retain them in assembled relation upon the inclined rails.

8. In a record keeping system, a cabinet, a skeleton frame removably positioned in said cabinet, said frame being provided with inclined rails, record holders positioned between said rails, and pivotal members projecting laterally from said record holders and bearing upon said inclined rails.

9. In a record keeping system, a cabinet, a skeleton frame removably positioned in said cabinet, said frame being provided with inclined rails, record holders positioned between said rails, pivotal members projecting laterally from said record holders and bearing upon said inclined rails, and means for tilting said record holders.

10. In a record keeping system, a cabinet, a pair of inclined supporting rails within said cabinet, a plurality of record bearing members arranged between said supporting rails and having laterally projecting portions that are pivotally mounted on said rails.

11. In a record keeping system, a cabinet, a pair of inclined supporting rails within said cabinet, a plurality of record bearing members arranged between said supporting rails and having laterally projecting portions that are pivotally mounted on said rails, and means for swinging the entire series of record bearing members upon their pivotal supporting points.

In testimony whereof I hereunto affix my signature this second day of March, 1920.

ROBERT C. BENDER.